June 13, 1944.　　A. G. HIGHTON　　2,351,126
MACHINE FOR PHOTOGRAPHICALLY COMPOSING TYPE CHARACTERS
Filed May 5, 1941　　11 Sheets-Sheet 1

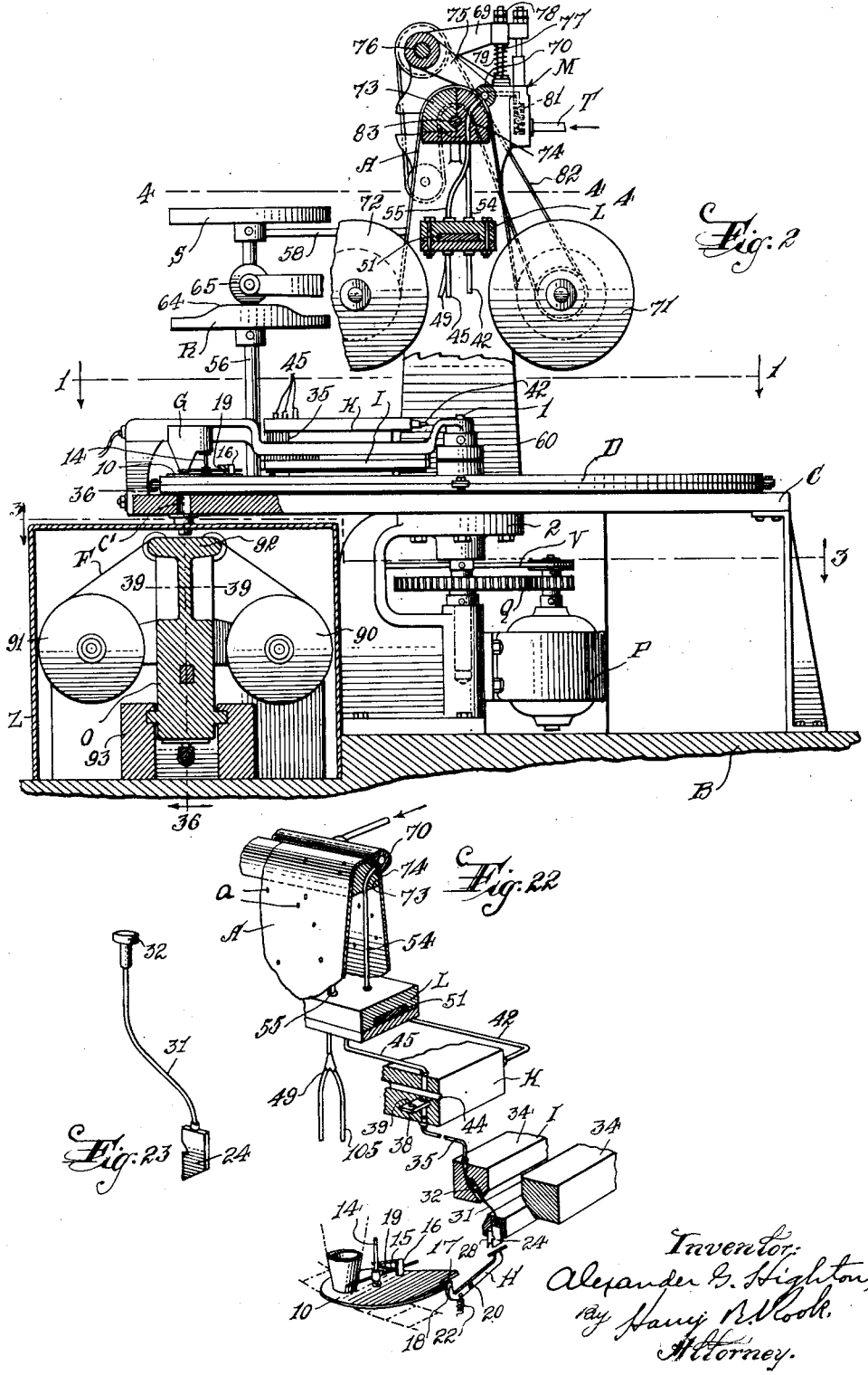

June 13, 1944. A. G. HIGHTON 2,351,126
MACHINE FOR PHOTOGRAPHICALLY COMPOSING TYPE CHARACTERS
Filed May 5, 1941 11 Sheets-Sheet 3
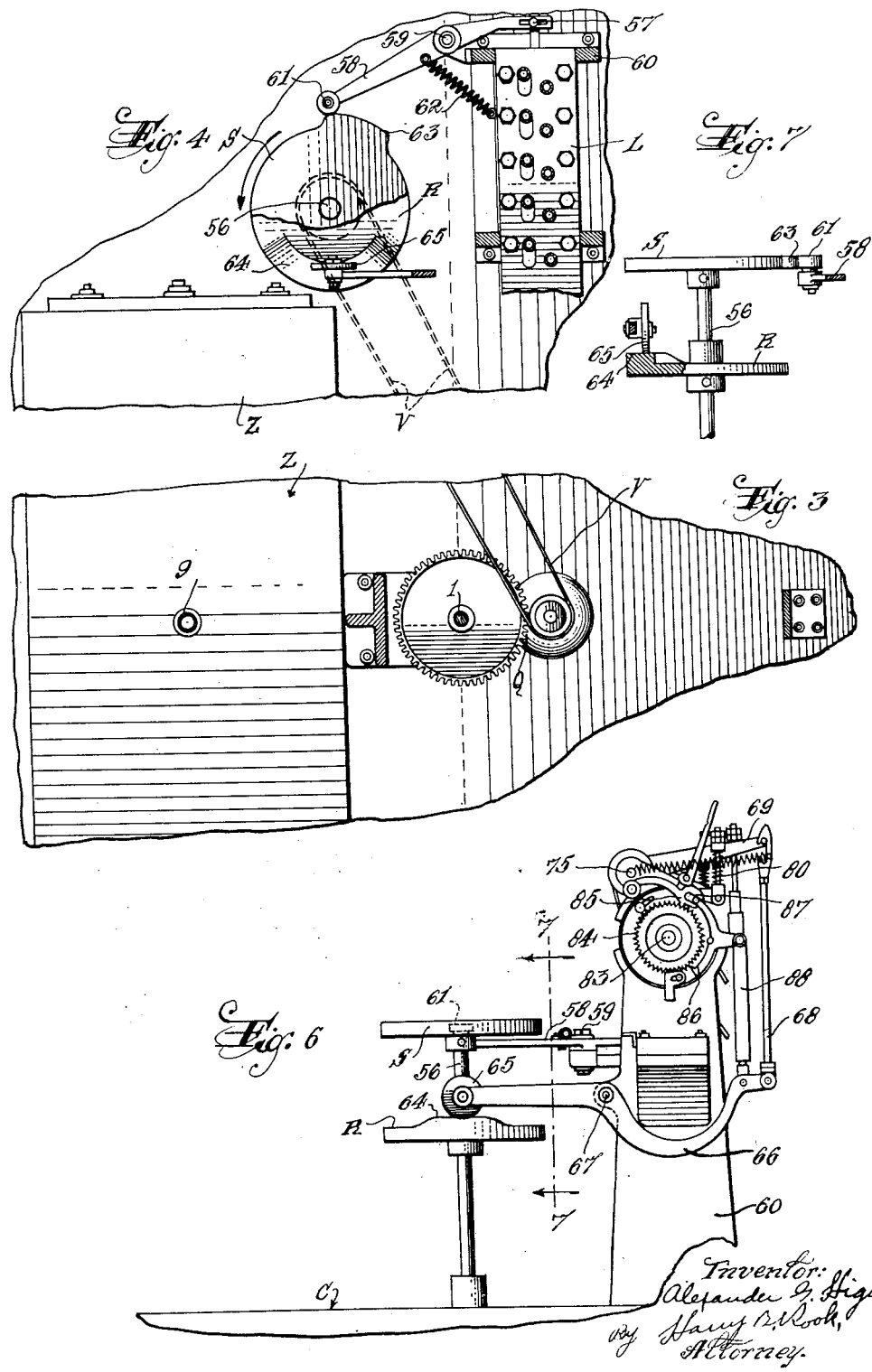

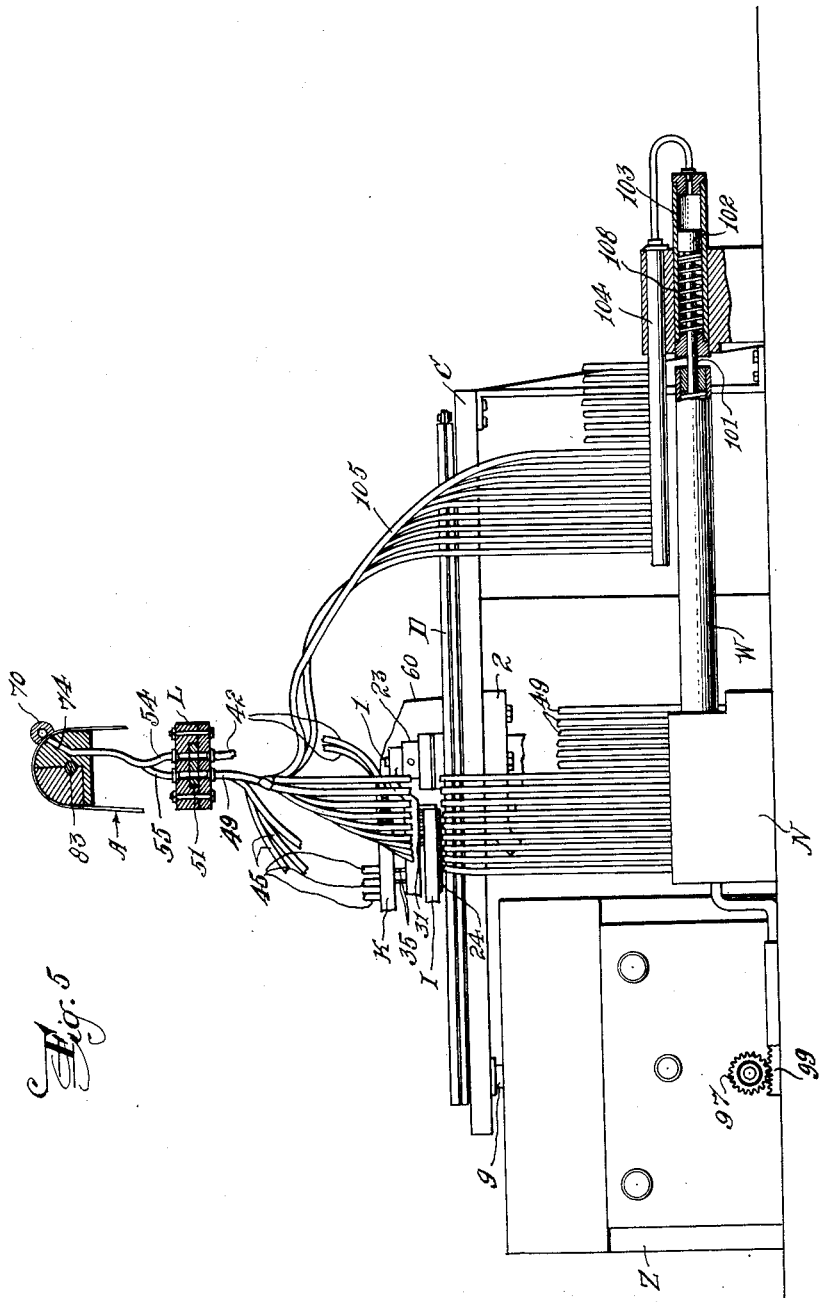

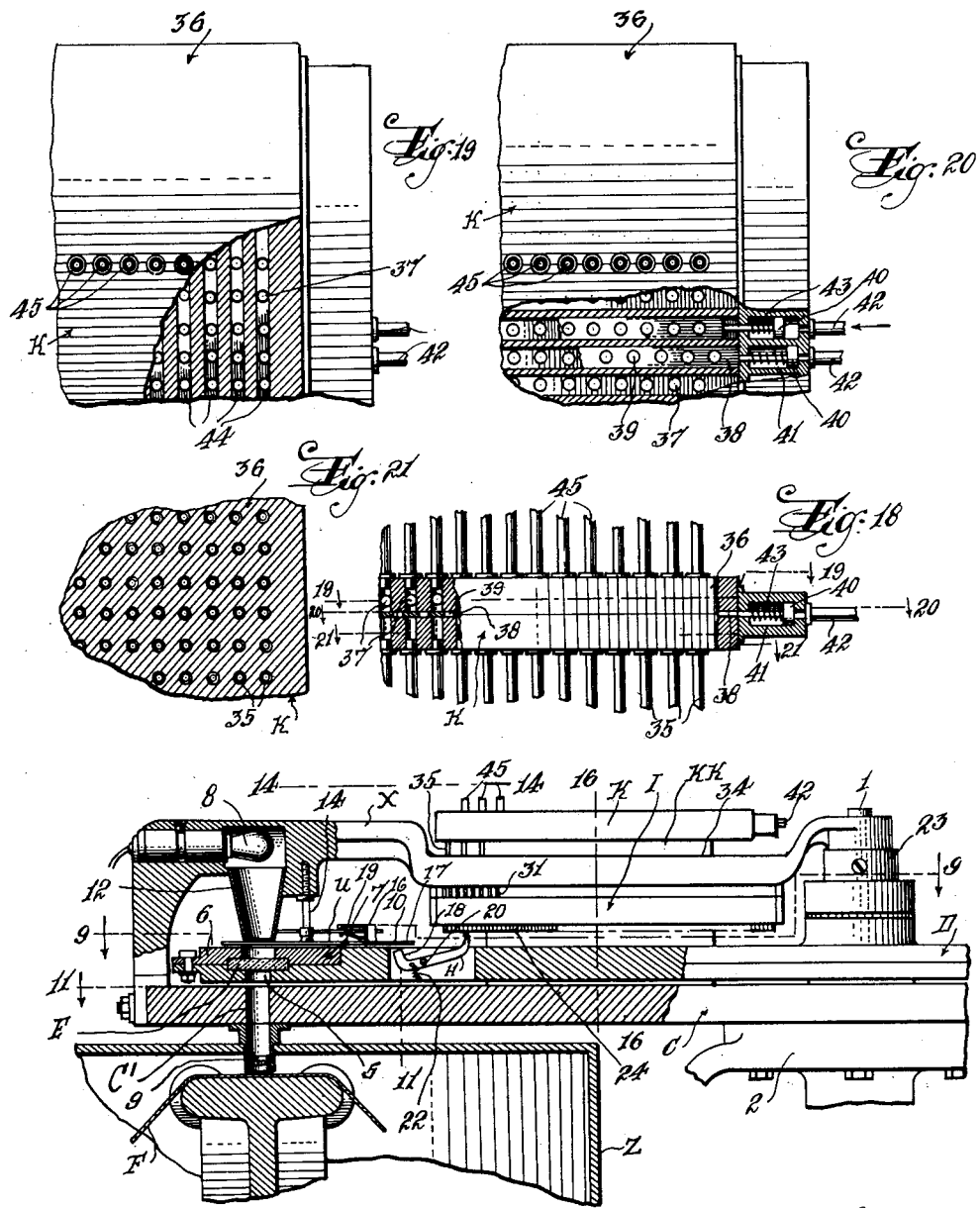

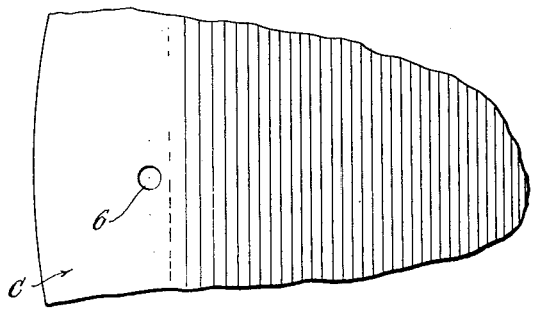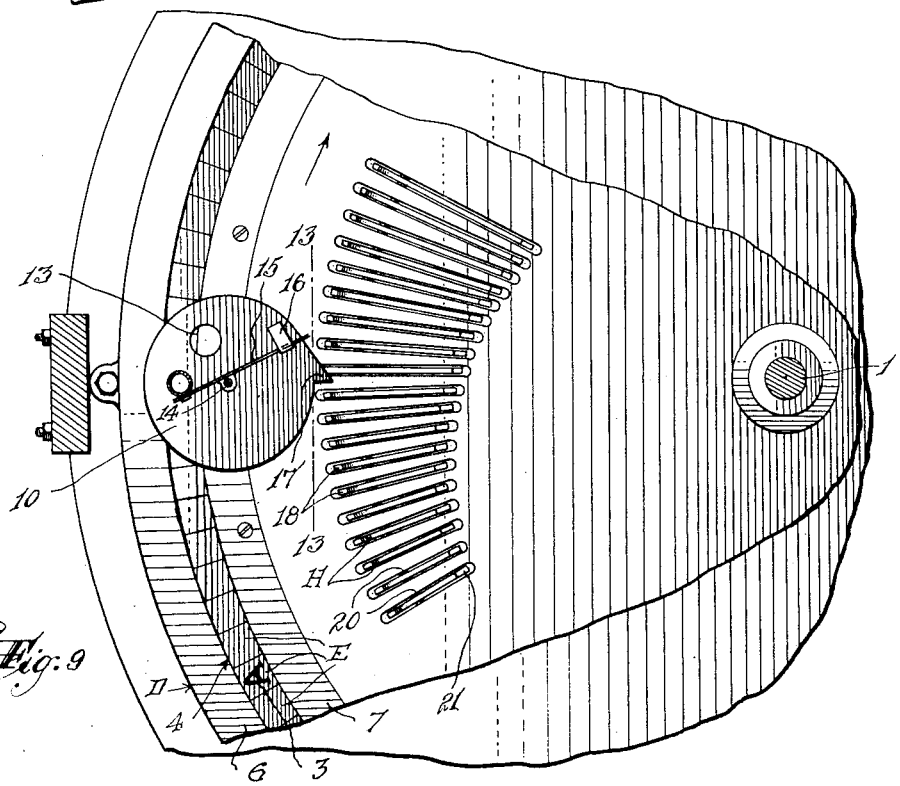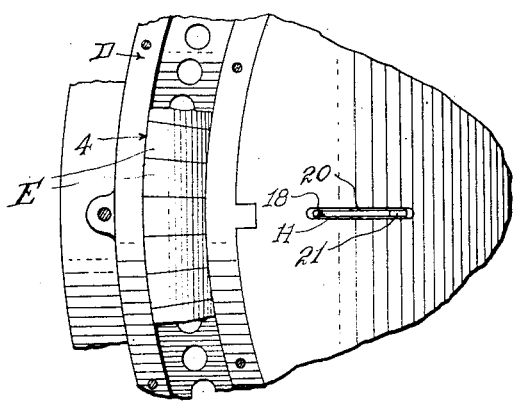

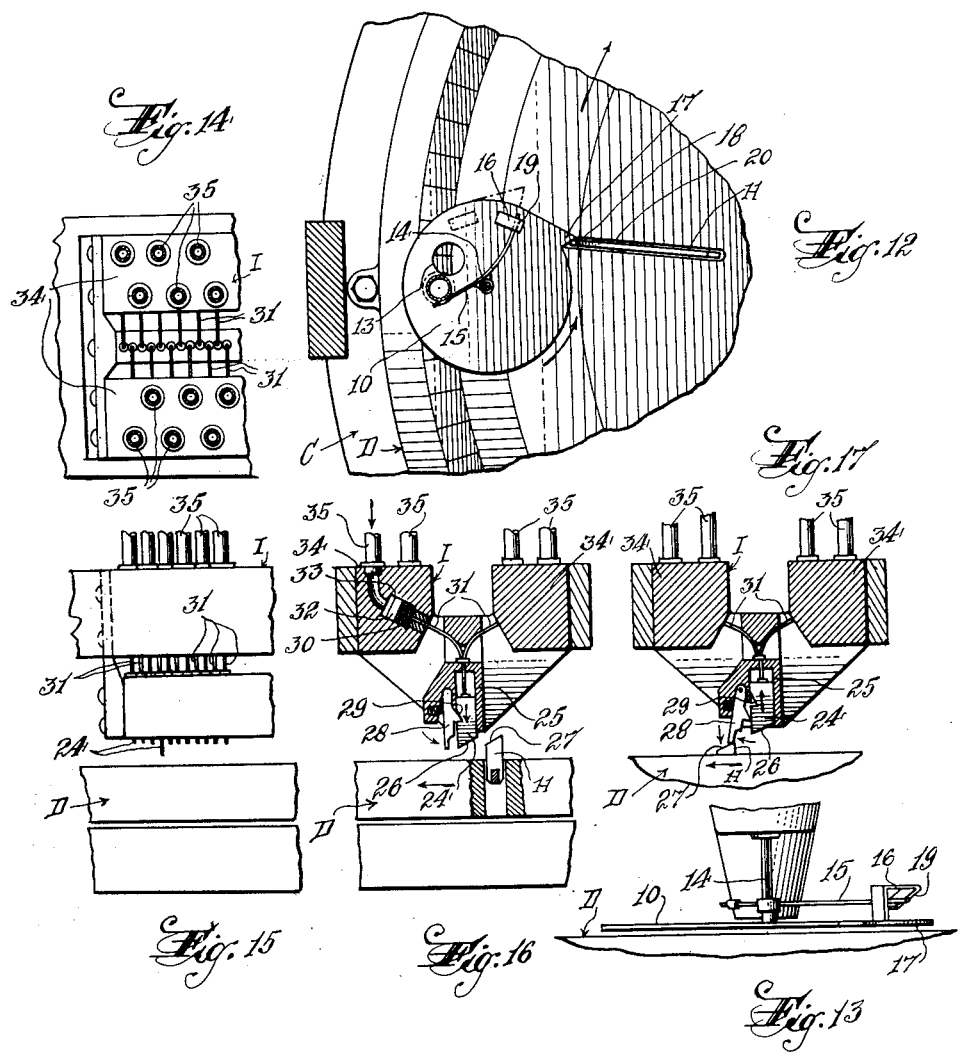

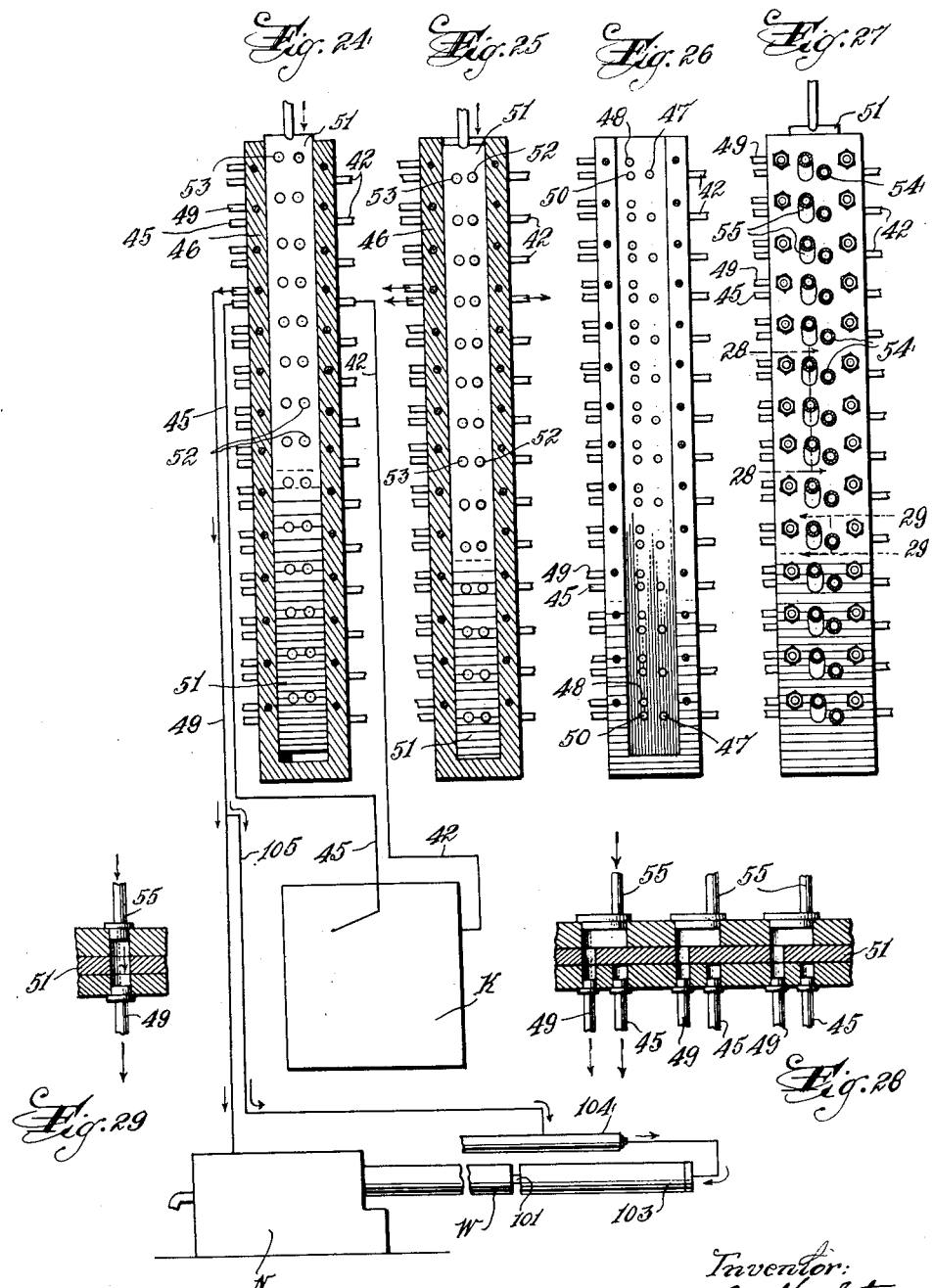

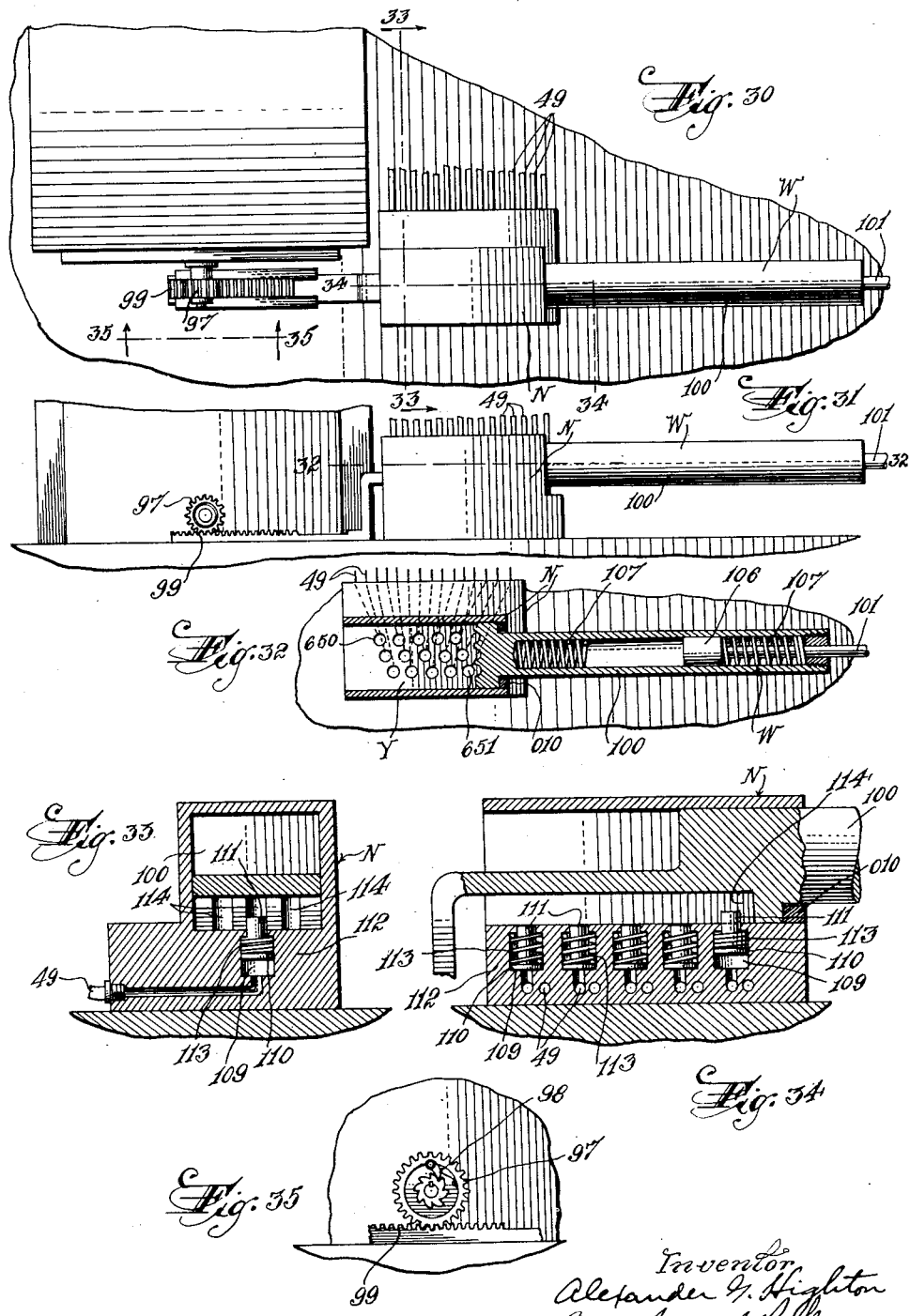

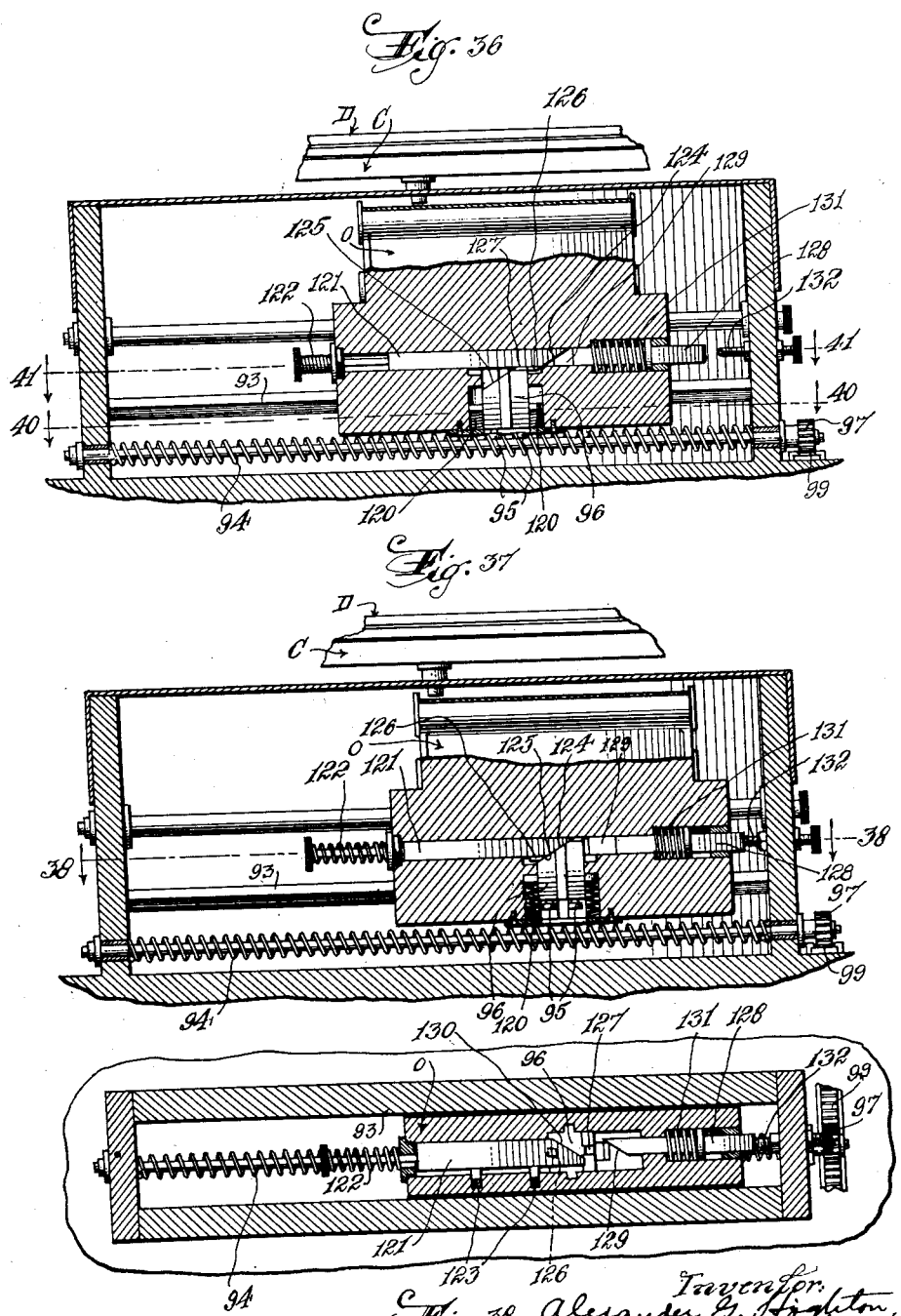

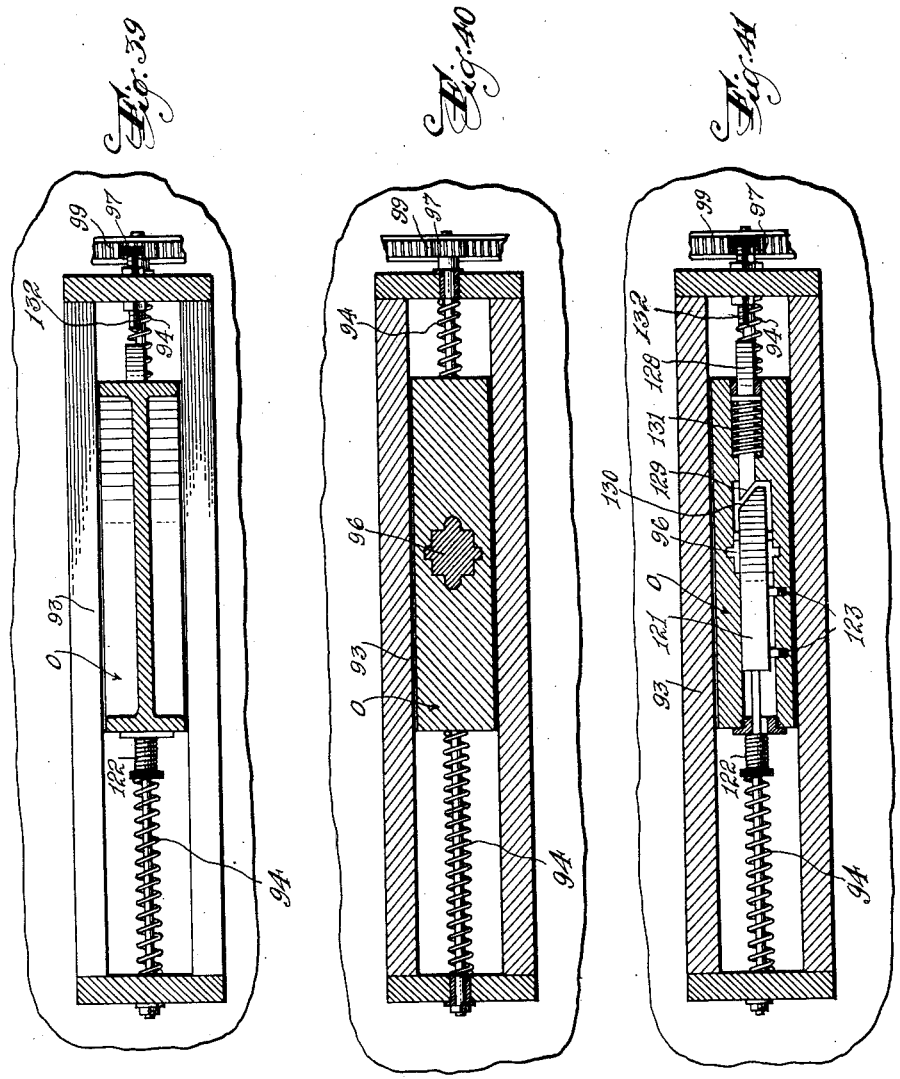

Patented June 13, 1944

2,351,126

UNITED STATES PATENT OFFICE 2,351,126

MACHINE FOR PHOTOGRAPHICALLY COMPOSING TYPE CHARACTERS

Alexander G. Highton, Paterson, N. J.

Application May 5, 1941, Serial No. 391,836

12 Claims. (Cl. 95—4.5)

This invention relates to a machine for photographically composing type characters, of the type wherein transparent characters or symbols on opaque backgrounds or opaque characters or symbols on transparent backgrounds, are photographically projected one at a time upon a sensitized surface for subsequent photographic reproduction for various purposes such as keeping records, or for printing operations, for example for use in offset or gravure printing.

More particularly my invention contemplates a machine of the general nature described wherein the selection of the type characters to be photographed, and the projection thereof upon a sensitized surface to receive the images of the projected characters, are controlled by a previously prepared record strip, for example, a perforated strip that controls pneumatically operated mechanisms.

A prime object of the invention is to provide an apparatus of this general character that shall embody novel and improved features whereby the character images shall be projected wholly automatically and in rapid succession upon a sensitized surface, for example, a light-sensitive surface on a sheet of paper, so that high-speed and efficient photographic composition of characters can be effected; and accordingly I contemplate a novel and improved construction and combination of a continuously moving power driven character carrier, for example, a disk or wheel, having arranged thereon the characters to be photographed or projected, a projector including a light source and a shutter mechanism juxtaposed to the path of movement of said characters, a carriage for an element having a light-sensitive surface also juxtaposed to said path of movement to receive images of the characters projected by said projector, and means controlled by a record strip continuously moving in timed relation to the character carrier for automatically selecting said characters and for causing actuation of said projector and said carriage, whereby the characters shall be projected in rapid succession and in predetermined order upon said light-sensitive surface.

Another object is to provide such an apparatus wherein the power-driven character carrier shall also carry a selector for each character to cooperate with said projector automatically when the character reaches a point in proper relation to said projector for projection of an image of the character, and said selector shall be actuated by an actuator that shall be controlled by said record strip, whereby the characters to be projected shall be selected and projected automatically and accurately and in rapid succession.

A further object is to provide in apparatus of this character novel and improved means to cooperate with said record strip for controlling said selector actuators, that shall be simple, efficient and reliable.

Another object is to provide novel and improved means to cooperate with said record strip for actuating the sensitized element carriage whereby said carriage shall be moved accurately and efficiently in timed relation to the actuation of the character carrier and the projector to receive character images in rapid succession in a line on the sensitized surface.

Other objects, advantages and results of the invention will be brought out by the following description in conjunction with the accompanying drawings in which Figure 1 is a horizontal sectional view taken on the line 1—1 of Figure 2, of a machine for photographically composing type characters embodying my invention, certain parts being omitted and the air tubes being shown schematically for clearness in illustration.

Figure 2 is a side elevational view of the machine with portions broken away and shown in section.

Figure 3 is a fragmentary horizontal sectional view on the line 3—3 of Figure 2.

Figure 4 is a similar view on the line 4—4 of Figure 2.

Figure 5 is a schematic side elevational view of the machine with portions omitted for clearness in illustration and other portions broken away and shown in section.

Figure 6 is a fragmentary side elevational view of the feeding mechanism for the record strip.

Figure 7 is a vertical sectional view taken on the line 7—7 of Figure 6.

Figure 8 is an enlarged fragmentary vertical sectional view on the line 8—8 of Figure 1.

Figure 9 is a horizontal sectional view on the line 9—9 of Figure 8, showing the shutter in normal position.

Figure 10 is a fragmentary view similar to Figure 9 showing the plate for holding the character blocks removed from the character carrier.

Figure 11 is a fragmentary horizontal sectional view on the line 11—11 of Figure 8.

Figure 12 is a view similar to Figure 9 showing the operation of the shutter to control projection of light rays through the character blocks.

Figure 13 is an enlarged vertical sectional view on the line 13—13 of Figure 9.

Figure 14 is an enlarged fragmentary sectional plan view on the line 14—14 of Figure 8.

Figure 15 is a side elevational view of the parts shown in Figure 14.

Figure 16 is a fragmentary vertical sectional view on the line 16—16 of Figure 8, showing one of the character selector actuators in operative position.

Figure 17 is a similar view showing the operation of a character selector and the release of the actuator for the selector.

Figure 18 is a sectional elevational view on the line 18—18 of Figure 1.

Figure 1:
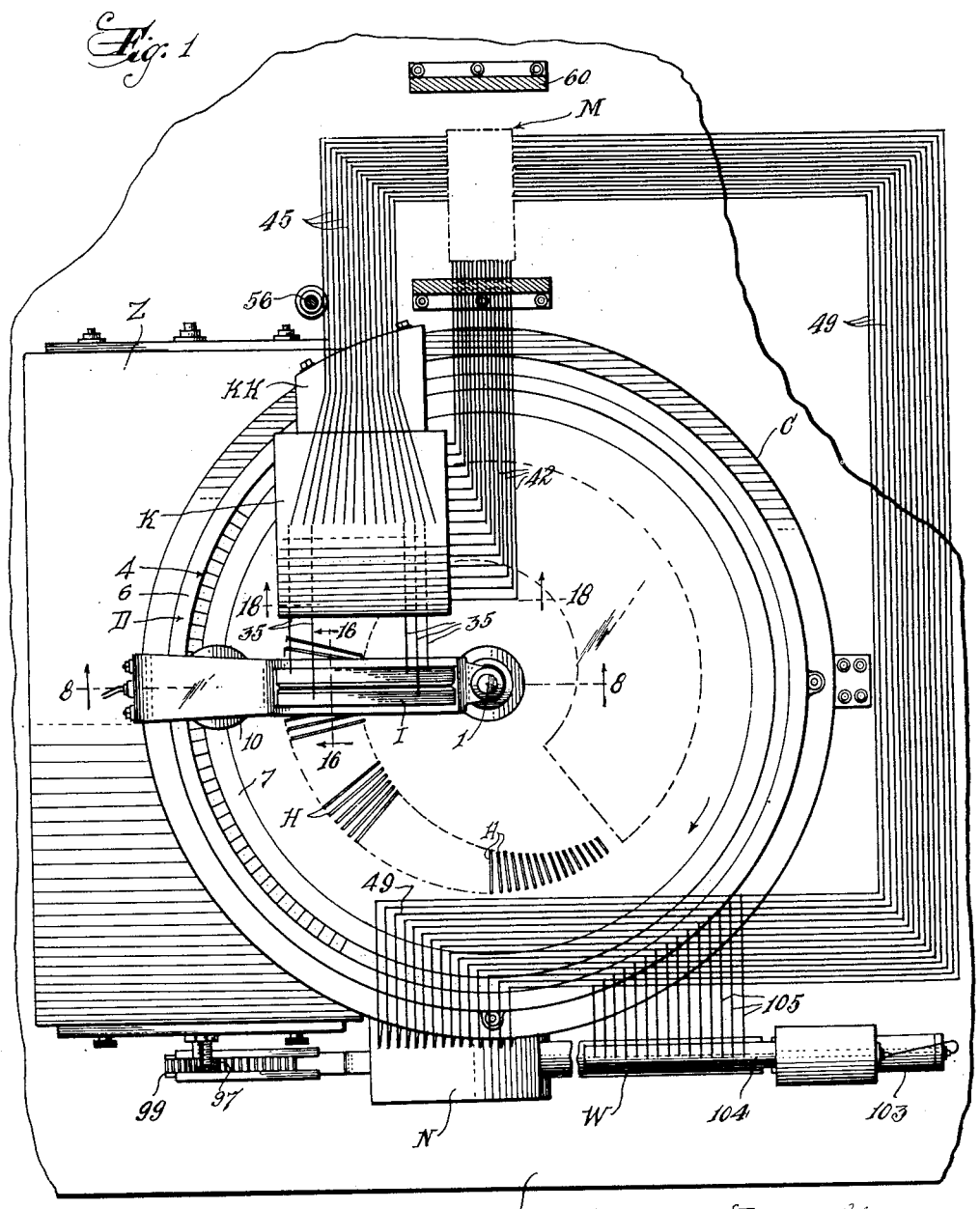

Figures 19, 20 and 21 are horizontal sectional views on the lines 19—19, 20—20 and 21—21 respectively of Figure 18, with portions omitted.

Figure 22 is a fragmentary schematic perspective view of the mechanisms for selecting and projecting a character.

Figure 23 is a detached perspective view of one of the selector actuators.

Figure 24 is a schematic view of the actuating mechanism for the sensitized strip, showing the auxiliary control valve for the pneumatic system in horizontal section and in normal position.

Figure 25 is a horizontal sectional view of the auxiliary control valve showing the valve slide in a different position from that shown in Figure 24.

Figure 26 is a plan view of the auxiliary control valve with the upper section and the valve slide removed.

Figure 27 is a top plan view of the auxiliary control valve.

Figure 28 is an enlarged fragmentary vertical sectional view on the line 28—28 of Figure 27.

Figure 29 is a similar view on the line 29—29 of Figure 27.

Figure 30 is a fragmentary enlarged top plan view of the actuating mechanism for the carriage for the sensitized strip.

Figure 31 is a side elevational view of the structure shown in Figure 30.

Figure 32 is a horizontal sectional view on the line 32—32 of Figure 31.

Figures 33 and 34 are vertical longitudinal sectional views 33—33 and 34—34 respectively of Figure 30.

Figure 35 is an enlarged side elevational view from the line 35—35 of Figure 30.

Figure 36 is a vertical longitudinal sectional view on an enlarged scale taken on the line 36—36 of Figure 2, showing the carriage for the sensitized strip in one position.

Figure 37 is a similar view showing the said carriage released for return to its initial position for starting the composition of a line of character images.

Figure 38 is a horizontal sectional view on the line 38—38 of Figure 37.

Figure 39 is a horizontal sectional view on an enlarged scale on the line 39—39 of Figure 2.

Figures 40 and 41 are horizontal sectional views on the lines 40—40 and 41—41, respectively of Figure 36.

In general, my invention contemplates a special form of character carrier, means such as a projection camera for projecting an image of each character on the sensitized surface of a paper strip, and a carriage for supporting and moving said paper strip transversely of itself step by step relatively to said image projecting means so as to arrange the images in a line.

Also, it is contemplated to use the punched record strip and a portion of the associated pneumatic system of the Lanston monotype casting and composing machine in conjunction with certain novel control mechanisms for controlling the selection of characters on the character carrier to be projected and the operation of the carriage for the sensitized strip. With my invention, a punched record strip which has been formed for casting and composing type on the known monotype casting machine, for example, as shown in Figure 111 of United States Patent No. 625,998 may be used for controlling the photographic projection of type characters corresponding to the type represented by said record or control strip.

This record or control strip is shown and is generally designated A in Figures 2 and 22, the strip being prepared in the usual way by punching at regular intervals holes $a$ representing each character and space entering into the composition of the matter to be set up. At the end of each series of perforations representing a complete line there is punched one or more perforations for controlling the width of each space between words, known as justifying spaces in order to cause the series of characters and spaces to justify or just fill the lines. The perforated record or control strip thus made is delivered to my photographic composing machine in reverse order of composition, so that in the procession of events the justification adjustments for the first line produced in the machine will first be effective, then the characters and spaces in inverse order of composition will be successively formed.

Now more specifically describing the invention, the machine is shown as comprising a base B upon which is mounted a table or frame C on which is journaled a character carrier D that is in the form of a circular plate. The character carrier has mounted thereon a circular row or series of character blocks E each of which has a character the image of which may be projected on a sensitized strip F by a camera or projector G that is mounted on the frame C above and beyond the rim of the character carrier D.

The operation of the projector G is controlled by a plurality of character selectors H mounted on the character carrier, one for each character, and said selectors are actuated by an actuator mechanism I that includes an actuator for each selector.

The actuators of the mechanism I are actuated by fluid pressure that is directly controlled by a mechanism K which controls the flow of compressed air from an auxiliary control valve L to which the flow of air is controlled by the main record strip A.

The supply of air to the auxiliary control valve L is controlled through the record strip A by a paper feeding mechanism M that may be of the same construction as that shown in Patent No. 625,998, particularly Figures 105, 107 and 109 of said patent.

The auxiliary control valve L also controls the flow of air to mechanism N for actuating the carriage O for the sensitized strip F, and the mechanism N includes means for both moving the carriage O and for regulating the distance of movement to properly space character images of different widths.

The character carrier D is continuously rotated in one direction as indicated by the arrow in Figure 1 by any suitable means such as an electric motor P through gearing Q.

The paper feed mechanism M is actuated to move the record strip A one step during each revolution of the character carrier D, by suitable means such as a cam mechanism R driven by a belt and pulley drive V from the motor P; and the auxiliary valve L also is actuated by a cam mechanism S driven from the same source as the cam mechanism so that air is caused to flow from a supply pipe T through certain of the perforations $a$ in the record strip and through the auxiliary control valve L to the carriage actuating mechanism N so as to move the carriage and the sensitized strip a distance sufficient to accommodate the character represented by the perforations in the record strip that at the instant are controlling the flow of air. Immediately successively, the auxiliary control valve L causes flow of air to the control mechanism K so that one of the actuators of the mechanism I is moved into position to engage the selector H that corresponds to the character represented by the before-mentioned perforations in the record strip A. Rotation of the character carrier D will bring the particular selector H into engagement with the corresponding character actuator (see Figures 16 and 17) so that the selector will be actuated to operate the projector. G, specifically the shutter U, as shown in Figures 8, 11 and 12, when the character block corresponding to said selector has been brought into proper relation to the projector for photographing the character or projecting an image thereof on the sensitized strip F. The particular actuator of the mechanism I is released into normal inoperative position by the engagement of the corresponding selector therewith.

Now describing the machine in more detail, the character carrier D is shown as mounted on a vertical shaft 1 journaled in bearings 2 on the frame C so that the character carrier is rotatable in a horizontal plane. The shaft 1 is rotated by the electric motor P and gearing Q.

The character blocks E may be of any suitable form and mounted on the carrier D in any suitable way, but as shown, each character block comprises a sheet or plate of transparent material that is properly related to the transparent and opaque portions defining a character 3. Each character block E has a different character and the blocks are arranged in side by side relation in a circular row and in a circular recess 4 in the carrier D. The carrier D has an opening 5 therethrough beneath each character, and the characters at the top of the carrier are exposed in a groove formed between two rings 6 and 7 that overlie the character blocks and hold them in position on the carrier.

The table C has an opening C' into register with which each character is brought during one revolution of the character carrier D, said opening serving to transmit light from a light source 8 such as an electric lamp bulb to a lens tube 9 through which the light is transmitted to the sensitized strip F that is disposed on the carriage O beneath the table.

The projection of light from the source 8 through the character blocks to project images of the characters on the sensitized strip F is controlled by a shutter 10 that is rotatable in a horizontal plane between the light source and the portion of the character carrier D on which the character blocks are mounted, the shutter normally being located to prevent passage of light from the light source through the light tube 12 to the character blocks and having an opening 13 that is brought into register with the light tube 12 when the character to be projected is brought into proper optical relation to the light tube for projection of a light beam through the corresponding character block. As shown, the shutter 10 is revolubly mounted on a shaft 14 and is held in normal position by a spring wire 15 that cooperates with a stop 16 carried by the shutter.

The shutter 10 is actuated to cause projection of a character image by engagement with a lug 17 on the shutter of the character selector H that corresponds to the character to be projected. Each character selector has an upturned end 18 that normally is disposed below the plane of the shutter 10 but is projected upwardly to engage the shutter lug 17 by means to be hereinafter described; and as the said upturned end engages the lug 17 during rotation of the character carrier D the shutter is rotated in the direction of the arrow of Figure 12, the stop 16 sliding off the end of the spring 15 to permit a complete rotation of the shutter which is stopped by riding of the beveled end 19 of the stop 16 over the end of the wire 15 as shown in Figures 9 and 13. The shutter is thus actuated with a snap action, and as the opening 13 passes beneath the end of the light tube 12, an image of the character corresponding to the selector H that is at the instant actuating the shutter will be projected on the light sensitive strip F.

The character selectors H are shown in the form of levers pivoted on the common horizontal axis 20, each in a recess or opening in the character carrier D, and each having the upturned end 18 to cooperate with the lug 17 on the shutter 10. The other end of each selector also is turned upwardly as at 21 to cooperate with one of the actuators of the mechanism I. As shown, the selectors are of different lengths and are so arranged on the character carried D that the ends 21 of the selectors travel in different circular paths during rotation of the character carrier. Suitable means such as a spring 22 normally influences each selector to retract the end 18 below the plane of the lug 17 of the shutter and at the same time project the corresponding end 21 upwardly above the top surface of the character carrier so as to be engaged by the corresponding actuator of the mechanism I when the latter is properly set.

As shown, the mechanism I is mounted above the top surface of the character carrier D on a supplemental frame X one end of which is connected to the table C while the other end is supported on a collar 23 on the upper end of the shaft 1. Within the mechanism I is an actuator 24 for each of the selectors H, and consequently there is one actuator 24 corresponding to each character 3 on the character carrier D. These actuators are arranged in a row and are vertically slidable in a guide bar 25, the row extending transversely of the circular paths of the ends 21 of the selectors H. The actuators normally are disposed above the planes of the ends 21 of the selectors, but each actuator is movable by means about to be described so as to be projected into the path of movement of the end 21 of the corresponding selector to actuate the latter. As shown, the lower end of each actuator is beveled at 26 and the end 21 of each selector is beveled at 27 so that when an actuator is projected for actuating the corresponding selector, the surface 27 of the selector will slide under the surface 26 of the actuator so as to oscillate the selector and move the end 18 thereof into position to engage the lug 17 on the shutter. For temporarily holding each actuator in this position, a spring actuated detent lever 28 is provided for each actuator to cooperate with a notch 29 in the actuator, said detent lever being disengaged from the corresponding actuator by engagement of the surface 27 of the selector after the latter has been actuated as shown in Figure 17. When the actuator is released by the detent lever as described the actuator is retracted into its normal position by a spring 30.

For moving the actuators into position to cooperate with the corresponding selectors H, each actuator is connected by a flexible wire 31 to a piston 32 that is reciprocable in a cylinder 33 that is in turn formed in a block 34. Compressed air is supplied to each cylinder 33 by a tube 35 so that when air enters the cylinder 33 the piston 32 is actuated to push on the wire 31 and project the corresponding actuator 24 into position for cooperation with the respective selector.

The supply and release of compressed air to and from the cylinders 33 of the mechanism I is controlled by the valve mechanism K. This mechanism comprises a substantially rectangular casing 36 mounted by a bracket KK on the table C above the character carrier D. The casing has a plurality of outlet ports 37, one for each of the actuators 24 each of said ports having connected thereto one of the tubes 35. The ports 37 are arranged in a plurality of rows; for example, where there are 225 characters 3 there will be 15 rows, each containing 15 ports. Each row is controlled by a valve slide 38 which has passages 39 corresponding to the respective ports 37, each valve slide being actuated in one direction by fluid under pressure controlled by the paper feed mechanism M. As shown, each valve slide has a piston 40 in a cylinder 41 to which compressed air is supplied through a tube 42 for moving the slide in one direction; and a spring 43 is provided for moving the slide in the other direction, all as shown in Figures 18 and 20.

The valve casing 36 also has a pluarlity of elongated passages 44 that extend transversely of the rows of ports 37, each of the passages 44 communicating with one of the ports 37 of each row of ports, as shown in Figure 19. Where there are 225 characters as assumed, there will be 15 passages 44, and each passage will be connected by a tube 45 to the paper feed mecahnism M.

In operation of the mechanism K, compressed air is supplied to one of the passages 44 through the corresponding tube 45 under control of the paper feed mechanism, and simultaneously compressed air is supplied to one of the pistons 40 for actuating the corresponding valve slide 38, so that air will be permitted to pass through one of the ports 37 which corresponds to one of the actuators 24 which in turn corresponds to one of the selectors H, which in turn corresponds to one of the characters 3, so that an image of said character will be projected by the projector or camera G upon the sensitized strip F.

It will be understood that the images of the characters 3 will be projected successively on the strip F, and in order to arrange the character images in a line, it is necessary to move the sensitized strip in a direction transversely of itself just prior to the projection of the image on the sensitized strip. In order to do this by pneumatic mechanism in accordance with the invention I have provided the auxiliary control valve L between the paper feed mechanism and the control mechanism K, said auxiliary control valve controlling the flow of compressed air from the paper feed mechanism to the mechanism K and to the carriage actuating mechanism N.

As shown, this auxiliary control valve L comprises a casing 46 that has a row of outlet ports 47 each of which is connected to one of the tubes 42. A plurality of pairs of outlet ports are also provided in the casing 46, each pair comprising a port 48 that is connected by a tube 49 to the carriage actuating mechanism N and a port 50 that is connected to one of the tubes 45 that leads to the mechanism K. The pairs of ports 48, 50 are arranged in a row and the two rows of ports are controlled by a valve slide 51 which has a plurality of passages 52, one to cooperate with each port 47 and a plurality of other passages 53 each to cooperate selectively with ports 48 and 50 of one pair of ports.

Each port 47 is connected to the paper feed mechanism by a tube 54, while a tube 55 connects the paper feed mechanism with each pair of ports 48 and 50, each tube 55 being common to the ports 48 and 50 of one pair of ports.

In operation, the valve slide 51 is normally located so that when air is permitted to flow from the paper feed mechanism through the tubes 54 and 55, the ports 53 will be located so as to permit flow of air through the tubes 49 to the carriage actuating mechanism N, but to prevent flow of air through the tubes 45 and 42, as shown in Figure 24, so as to move the light sensitive strip F the proper distance to receive an image of the next character to be projected.

While the air is permitted to flow from the paper feed mechanism through the tubes 54 and 55, the valve slide 51 is actuated into the position shown in Figure 25 to permit flow of air simultaneously through the tubes 42 and 45 for the selection of the character to be projected.

It will thus be seen that the paper feed mechanism M and the valve slide 51 of the auxiliary control valve L must be actuated in timed relation to each other, and as above described, the paper feed mechanism is operated by a cam mechanism R and the auxiliary valve L is operated by a cam S. These two cams are mounted on a common vertical shaft 56 that is journaled in the frame C and driven by the belt and pulley drive V in timed relation to the rotation of the character carrier D.

The auxiliary valve slide L has a pin and slot connection 57 with one end of a lever 58 that is pivotally mounted intermediate its ends at 59 on the frame 60 of the paper feed mechanism.

The other end of the lever 58 has a follower roller 61 that is held in engagement with the cam S by a spring 62, and the cam S has a cam projection 63 for oscillating the lever 58 to reciprocate the valve slide 51.

The cam mechanism R has a cam surface 64 that cooperates with a follower roller 65 on one end of a lever 66 that is pivotally mounted intermediate its ends at 67 on the frame 60 and has its other end connected to a link 68 to one of the arms 69 that actuates an air bar 70 of the paper feed mechanism M.

This mechanism may be substantially the same as that shown in United States Patent No. 625,998 as illustrated in Figures 105, 107 and 109 of that patent and described on pages 26 and 27 of the patent. In general, the record control strip A is mounted on the spools 71 and 72 that are journaled in the frame 60 that is mounted on the table C of the machine. The control strip passes over a semi-cylindrical cross bar 73 which is provided with a longitudinal series of ports 74 which are connected to the respective tubes 54 and 55. The air bar 70 has a longitudinal air chamber to register with the ports 74, said bar being supported by the arms 75 that are pivoted loosely on a shaft 76. This shaft has the two arms 69, each of which is connected to one end of the air bar by a rod 77 that is pivoted upon the air bar and passes through the lug on the arm 69, a nut 78 on the rod 77 forming a connection for raising the air bar and a spring 79 being interposed between the lug and the air bar to provide a yielding pressure for pressing and sealing the latter against the control strip A. The air bar normally is elevated by a spring 80 which engages one of the arms 69, while the other arm 69 carries an adjustable contact for engaging the air inlet valve 81 to open the latter when the air bar is depressed and seated upon the record strip.

Briefly describing the operation of these parts, the spools 71 and 72 are driven to move the control strip over the cross bar 74 by a pulley and belt mechanism 82 and pinwheels (not shown) mounted on a shaft 83 that have pins to enter longitudinal lines of perforations in the edges of the control strip. The shaft 83 on which the pinwheels is mounted is turned sufficiently to advance the control strip from one line of perforations a to the next, and at the same time the winding spool 71 is rotated to wind the record strip thereon. When a feed motion has been thus produced the air bar is brought down into close contact with the surface of the record strip and at the same time or immediately thereafter the inlet valve 81 is opened and air under pressure admitted within the air bar. This air escapes through such of the ports in the cross bar 74 as are uncovered by perforations in the record strip (see Figures 2 and 22) and passes to the respective tubes 54 and 55.

As above indicated the control strip and air bar are driven from the cam R through the lever 66. The shaft 83 is driven by a suitable pawl and ratchet mechanism which includes a ratchet wheel 84 with which cooperates pawls 85 and 86 that are interconnected at 87 and one of which is connected by a link 88 to the lever 66. With this construction, the ratchet wheel and shaft are rotated step by step in known manner to advance the control strip step by step.

Now, reverting to the carriage actuating mechanism N, as above explained, it is necessary that the air under control of the paper feed mechanism be first permitted to operate the carriage actuating mechanism N by admitting air through the auxiliary control valve L to the tubes 49, and accordingly it will be understood that the cam surfaces 63 and 64 will be properly related to feed the control strip A, actuate the air bar 70 and actuate the valve slide 51 of the auxiliary valve L to effect the above result described.

Specifically describing the carriage mechanism for the sensitized strip F, the carriage O has a supply roll 90 and a winding roll 91 for mounting the sensitized strip F for longitudinal movement over a platen 92 beneath the lens tube 9 of the projector G. These rolls 90 and 91 may be actuated to move the strip longitudinally for spacing lines of character images by any suitable mechanism not shown.

For moving the strip F transversely of itself to space the images in a line and for spacing between words, the carriage O is slidable in a guideway 93, being automatically actuated in the direction to space the character images, by a screw rod 94 of long pitch that is journaled to rotate about a horizontal axis in the guideway 93. This screw rod cooperates with a nut element that is in the form of two rollers 95 to engage the screw, said rollers being mounted on a block 96 that is vertically reciprocable in the carriage O for separably engaging the rollers with the screw. The screw is rotated step by step in one direction by a pinion 97 having a pawl and ratchet connection 98 with the screw and driven by a rack bar 99 which is pneumatically actuated and the extent of each step of movement of which is automatically controlled so as to move the carriage O the proper distance to receive the image of the character being projected.

As shown, the rack bar 99 is connected to a driving rod W that comprises the two sections 100 and 101 that are relatively longitudinally movable. The section 101 carries a piston 102 that is mounted in a cylinder 103, compressed air to which is supplied through a manifold 104 from tubes 105 each of which constitutes a branch of one of the tubes 49 that leads from the auxiliary control valve L. When compressed air is permitted to flow through a tube 49 from the port 48 of the auxiliary control valve L, the piston 102 is actuated by said compressed air in one direction. This causes movement of the section 101 of the rod for actuating the rack bar 99, and said section 101 has a head 106 slidable in the section 100 between two springs 107. Accordingly, when the piston 102 is moved under the influence of the compressed air (see Figures 5 and 32) the head 106 will engage the spring 107 and actuate the rack 99 to rotate the screw 94 and move the carriage O one step. The piston 102 is actuated in the opposite direction by a spring 108. This lost motion between the two sections 100 and 101 of the driving rod W is required to compensate for the time required for operation of the setting mechanism Y for limiting the extent of movement of the rack bar 99.

This setting mechanism Y is also controlled by the compressed air passing through the tubes 49, so that the same impulse of compressed air will operate the setting mechanism and actuate the piston 102 and the rack bar. As shown, each tube 49 is connected to a cylinder 109 in which is a piston 110 connected to a gauge stop pin 111 so that the compressed air will project the gauge pin 111 upwardly above the surface of the cylinder block 112 into the path of movement of a stop shoulder 114 on the section 100 of the driving rod W. The piston 110 is actuated in the other direction by a spring 113. These stop gauge pins 111 are in general similar to the gauge pins 65 disclosed in Patent No. 625,998, there being a series comprising 15 movable pins which are arranged in certain relations with each pin corresponding to a certain width of character. In this connection it will be remembered that different letters or characters will require different amounts of space for the projection of their images and as suggested in the above-mentioned Patent No. 625,998, all characters having the same width or requiring the same amount of space are grouped together. In the present instance there are 15 groups of 15 characters each, and each row of ports 37 in the control mechanism K corresponds to one group. Accordingly, each of the gauge pins 111 corresponds to a group of characters of the same width and the pin 650 may represent the group of greatest width. The other pins are spaced relatively to the pin 650 and the direction of movement of the stop shoulder 114 in accordance with the relative widths of the corresponding groups of characters, the pin 651 representing the group of smallest width.

In operation of the carriage actuating mechanism when the control strip A has been moved one step to present to the air bar 70 and one of the ports 74 in the cross bar 73, perforations *a* corresponding to a given character, compressed air passes from the supply T through the valve 81, the air bar, the port 74, the tube 55, the port 53 of the valve slide 51, the port 48 of the auxiliary valve L and the corresponding tube 49. A portion of the air passes to the cylinder 109 that corresponds to the group of characters in which said character is located to project the corresponding stop gauge pin 111, while another portion of the air moves through the corresponding branch tube 105 and the manifold 104 to the cylinder 103. The piston 102 will be operated approximately simultaneously with the setting of the pin 111, but the lost motion between the sections 101 and 100 of the driving rod W will result in a slightly delayed reciprocation of the rack bar 99 so that the stop pin will be in position to limit the movement of the rack bar by the time the stop shoulder 114 of the drive rod has reached the pin as shown in Figure 34.

This sequence of operations results in the movement of the sensitized strip carriage O a distance corresponding to the width of the character to be projected. After the character image has been formed on the sensitized strip F, the air bar 70 is elevated to exhaust the compressed air from the system and the piston and rack bar 99 are returned to their normal position by the spring 108, the return movement being limited by a stop O10 and the pawl and ratchet connection 98 between the pinion 97 and the screw rod 94 permitting this action without backward rotation of the screw rod or carriage O.

The successive projection of character images is continued until the end of a line has been reached, whereupon the carriage O is disconnected from the screw rod 94 and returned by any suitable mechanism, for example, by hand to its initial position, ready for the beginning of the projection of another line of character images. For this purpose, the block 96 is normally influenced upwardly by springs 120 to disengage the rollers 95 from the screw rod 94 for cooperating with the block 96 to cause engagement and release of the rollers 95 with and from the screw rod I may utilize a holding block 121 that is reciprocable longitudinally of the carriage O across the upper end of the block 96 and normally is influenced away from the block to release the latter by a spring 122. The holding slide also is laterally movable against the influence of springs 123. One end of the holding slide 121 has a beveled surface 124 to cooperate with a corresponding bevel 125 on the block 96 so that when the holding slide and block are in one relative position as shown in Figure 37 the block may be elevated by the springs 120 to disengage the rollers 95 from the screw rod. This relative position of parts is usually assumed at the position of the carriage corresponding to the end of a line of character images, and when the carriage is moved to its initial position (to the left in Figure 37), the projecting end of the holding slide 121 will engage the end of the guideway 93 so as to force the holding slide 121 inwardly and cause relative sliding of the beveled surfaces 124 and 125, whereby the block 96 is forced downwardly to cause engagement of the rollers 95 with the screw rod, for example as illustrated in Figure 36.

The holding slide 121 is held in this position against the influence of the spring 122 by a lug 126 which engages behind a lug 127 on the top of the block 96. When the carriage has reached the position corresponding to the end of a line of images as shown in Figure 37, the holding slide 121 is slid latterly to disengage the lug 126 from the lug 127. This lateral movement is effected automatically by a releasing slide 128 that has a beveled surface 129 to cooperate with a beveled surface 130 on the holding slide, said beveled surfaces being brought into engagement by reciprocation of the releasing slide 128 which is caused by abutment of the slide with an adjustable stop 132 on the end of a guideway 93 (see Figures 37, 38 and 41). The releasing slide 128 is returned to its normal position by a spring 121 when the carriage is moved to its initial position, i. e. to the left in Figure 38.

The carriage O and light sensitive strip F are enclosed in a suitable substantially light-proof casing Z into which the lens tube 9 is extended.

With this construction it will be understood that my invention includes means, the character carrier D, for continuously moving a plurality of characters in predetermined path in succession and in successive continuous cycles past a certain point, at which point there is a projector or camera which is controlled by character selectors one for each character, which in turn are actuated by the corresponding actuator 24 that is in turn controlled by the valve mechanism K, and the mechanism K which controls operation of the actuators in accordance with the perforations in the control or record strip A. It will also be understood that the sensitized strip F is moved by virtue of the carriage O automatically to space the character images in a line, movement of the carriage being pneumatically controlled through the paper feed mechanism including the record strip, and the auxiliary valve L.

While I have shown and described the invention as embodied in certain specific details of structure and in many instances schematically, it should be understood that this is primarily for illustrating the now preferred embodiment of the invention and that the invention may be embodied in other and different details of structure without departing from the spirit or scope of the invention.

Having thus described my invention, what I claim is:

1. In combination, a character projector, a character carrier provided with characters and movable continuously in one direction in a predetermined path to move said characters in succession to a position for projection of images of said characters by said projector, a character selector for each character and mounted on said carrier for causing operation of said projector when the corresponding character is in said position, and means for selectively actuating said selectors to cause projection of images of selected characters in succession.

2. In combination, a character projector, a character carrier provided with characters and movable continuously in one direction in a predetermined path to move said characters in succession to a position for projection of images of said characters by said projector, a record strip movable in timed relation to said carrier and having portions each corresponding to a certain character, a character selector for each character and mounted on said carrier for causing operation of said projector when the corresponding character is in said position, and means controlled by said record strip for selectively actuating said selectors to cause projection of images of selected characters in succession.

3. In combination, a character projector, a character carrier provided with characters and movable continuously in one direction in a predetermined path to move said characters in succession to a position for projection of images of said characters by said projector, a character selector for each character and mounted on said carrier for causing operation of said projector when the corresponding character is in said position, a plurality of fluid pressure operated actuators each for actuating one of said selectors, a record strip movable in timed relation to said carrier and having perforations each corresponding to one of said characters, and means cooperating with said record strip for controlling supply of fluid pressure to said fluid pressure operated actuators selectively for actuating said selectors selectively to cause projection of images of selected characters in succession.

4. In combination, a character projector, a character carrier provided with characters and movable continuously in one direction in a predetermined path to move said characters in succession to a position for projection of images of said characters by said projector, a character selector for each character and mounted on said carrier for causing operation of said projector when the corresponding character is in said position, a plurality of fluid pressure operated actuators each for actuating one of said selectors, a record strip movable in timed relation to said carrier and having perforations each corresponding to one of said characters, a carriage for a sensitized surface to receive said projected images, a fluid pressure operated device for moving said carriage step-by-step in one direction to arrange said images in a line, and means cooperating with said record strip and with said fluid pressure operated actuators and said fluid pressure operated device to control supply of fluid pressure respectively to said actuators selectively and to said device for actuating said selectors selectively and for actuating said carriage step-by-step to cause projection of images of selected characters in succession in a line.

5. The combination set forth in claim 1 wherein said character projector includes a light source and a shutter, and said character selectors actuate said shutter to cause operation of said projector.

6. The combination set forth in claim 3 wherein said character projector includes a light source and a shutter, and said character selectors actuate said shutter to cause operation of said projector.

7. The combination set forth in claim 4 with the addition of a fluid pressure operated gauge mechanism controlled by said record strip and the last-named means to regulate the extent of movement of said device for moving said carriage.

8. In a machine for photographically composing single type characters, the combination of an assortment of single type characters required for composing at least one line of words arranged in predetermined relation to each other for movement in a predetermined common path one behind another, a movable record strip having portions each corresponding to a certain character, mechanism controlled by said record strip for selecting individual characters, means actuated in timed relation to movement of said record strip for causing movement of said selected characters in the order of selection in said predetermined path one behind another past a common exposure point, a character projector at said point, and means for actuating said projector while each character is in motion and as it passes said point to project images of said characters in succession, a carriage for a sensitized surface to receive said images, and means for moving said carriage step-by-step in alternate relation to the projection of said images.

9. In a machine for composing single type characters, the combination of a support holding in predetermined relation to each other for movement in a predetermined common path one behind another, an assortment of different single type characters of different widths required for composing at least one line of words, means for selecting individual characters in succession, means including said support for continuously moving said selected characters in the order of selection in said common path one behind the other past a common exposure point, means for projecting an image of each selected character while it is in motion and during movement of the character past said point, a carriage for a sensitized surface to receive said images, and means for variably moving said carriage in timed relation to the projection of said images and in steps each of a length corresponding to the width of the character image next to be projected.

10. In a machine for photographically composing single type characters, the combination of a support having thereon in predetermined relation to each other for movement in a predetermined common path one behind another, an assortment of different single type characters of different widths required for composing at least one line of words, means for selecting individual characters in succession, means including said support for causing movement of said selected characters in the order of selection in said predetermined path and one behind another past a common exposure point, means for photographing each selected character while it is in motion and during its movement past said point, said means including a light source and a shutter, means for actuating said shutter while each selected character is in motion and as it passes said point to project images of said characters in succession, a carriage for a sensitized surface to receive said images, and means for variably moving said carriage in timed relation to the projection of said images and in steps each of a length corresponding to the width of the character image next to be projected.

11. In a machine for composing single type characters in a line, a rotatable carrier provided with a circular row of type characters concentric with said carrier and comprising an assortment of different single type characters of different widths required for composing at least one line of words, means for continuously rotating said carrier in one direction to move said characters in a circular path one behind the other, a character projector disposed at a predetermined point at one side of said path to project images of said characters while said characters are in motion and as they reach said point, means for causing operation of said projector selectively and successively to project in succession images of selected characters, and mechanism for variably moving a light sensitive strip in timed relation to the projection of said images and in steps each of a length corresponding to the width of the character image next to be projected.

12. The combination of means for continuously moving in succession one behind another and in successive continuous cycles past a common exposure point, an assortment of different single type characters of different widths required for composing at least one line of words, a character projector at said point for projecting images of said characters, means for causing operation of said projector selectively once during each cycle to project an image of a selected character whereby images of selected characters are projected in succession, and mechanism for variably moving a light sensitive strip in alternate relation to the projection of said images and in steps each of a length corresponding to the width of the character image next to be projected.

ALEXANDER G. HIGHTON.